(12) United States Patent
Sugahara et al.

(10) Patent No.: US 9,985,536 B2
(45) Date of Patent: May 29, 2018

(54) CURRENT RESONANT POWER SUPPLY DEVICE

(71) Applicant: SANKEN ELECTRIC CO., LTD., Niza-Shi, Saitama (JP)

(72) Inventors: Takeki Sugahara, Higashimatsuyama-Shi (JP); Osamu Ohtake, Saitama-Shi (JP)

(73) Assignee: SANKEN ELECTRIC CO., LTD., Niiza-shi (JP)

( * ) Notice: Subject to any disclaimer, the term of this patent is extended or adjusted under 35 U.S.C. 154(b) by 0 days. days.

(21) Appl. No.: 15/670,468

(22) Filed: Aug. 7, 2017

(65) Prior Publication Data

US 2018/0041131 A1    Feb. 8, 2018

Related U.S. Application Data

(60) Provisional application No. 62/372,051, filed on Aug. 8, 2016, provisional application No. 62/372,029, filed on Aug. 8, 2016.

(51) Int. Cl.
*H02M 3/335* (2006.01)
*H02M 1/08* (2006.01)
*H02M 1/00* (2006.01)

(52) U.S. Cl.
CPC ......... *H02M 3/33507* (2013.01); *H02M 1/08* (2013.01); *H02M 2001/0009* (2013.01)

(58) Field of Classification Search
CPC .................. H02M 2001/0035; H02M 3/3353
USPC ................................................. 363/21.02, 97
See application file for complete search history.

(56) References Cited

U.S. PATENT DOCUMENTS

| | | | | |
|---|---|---|---|---|
| 8,774,669 | B2 * | 7/2014 | Hayasaki | ................ H02M 1/44 399/88 |
| 8,811,040 | B2 * | 8/2014 | Halberstadt | ........... H02M 3/337 323/282 |
| 2015/0263629 | A1 * | 9/2015 | Stuler | ............... H02M 3/33546 363/21.02 |
| 2016/0065075 | A1 | 3/2016 | Sugahara et al. | |
| 2016/0294273 | A1 * | 10/2016 | Kawamura | ....... H02M 3/33523 |
| 2017/0154739 | A1 * | 6/2017 | Sugahara | ................ H01H 9/54 |

FOREIGN PATENT DOCUMENTS

JP            5384973 B2    1/2014
JP        2014060895 A    4/2014

* cited by examiner

*Primary Examiner* — Jeffrey Sterrett
(74) *Attorney, Agent, or Firm* — Metrolexis Law Group, PLLC

(57) ABSTRACT

A first switch and a second switch connected in series to both terminals of a DC power source. A signal generation circuit generates a feedback signal based on the DC voltage detected by the voltage detection circuit, and outputs the feedback signal, the feedback signal for turning the first and second switches on and off. A burst oscillation circuit that generates a burst oscillation signal based on a feedback signal and turns the first switch element and the second switch element on and off based on the burst oscillation signal when the standby state is detected. The burst oscillation circuit comprises a capacitor and a rapid charge circuit. When this device returns from standby state to normal state, the rapid charging circuit charges the capacitor after the feedback signal exceeds the cancellation threshold voltage.

6 Claims, 8 Drawing Sheets

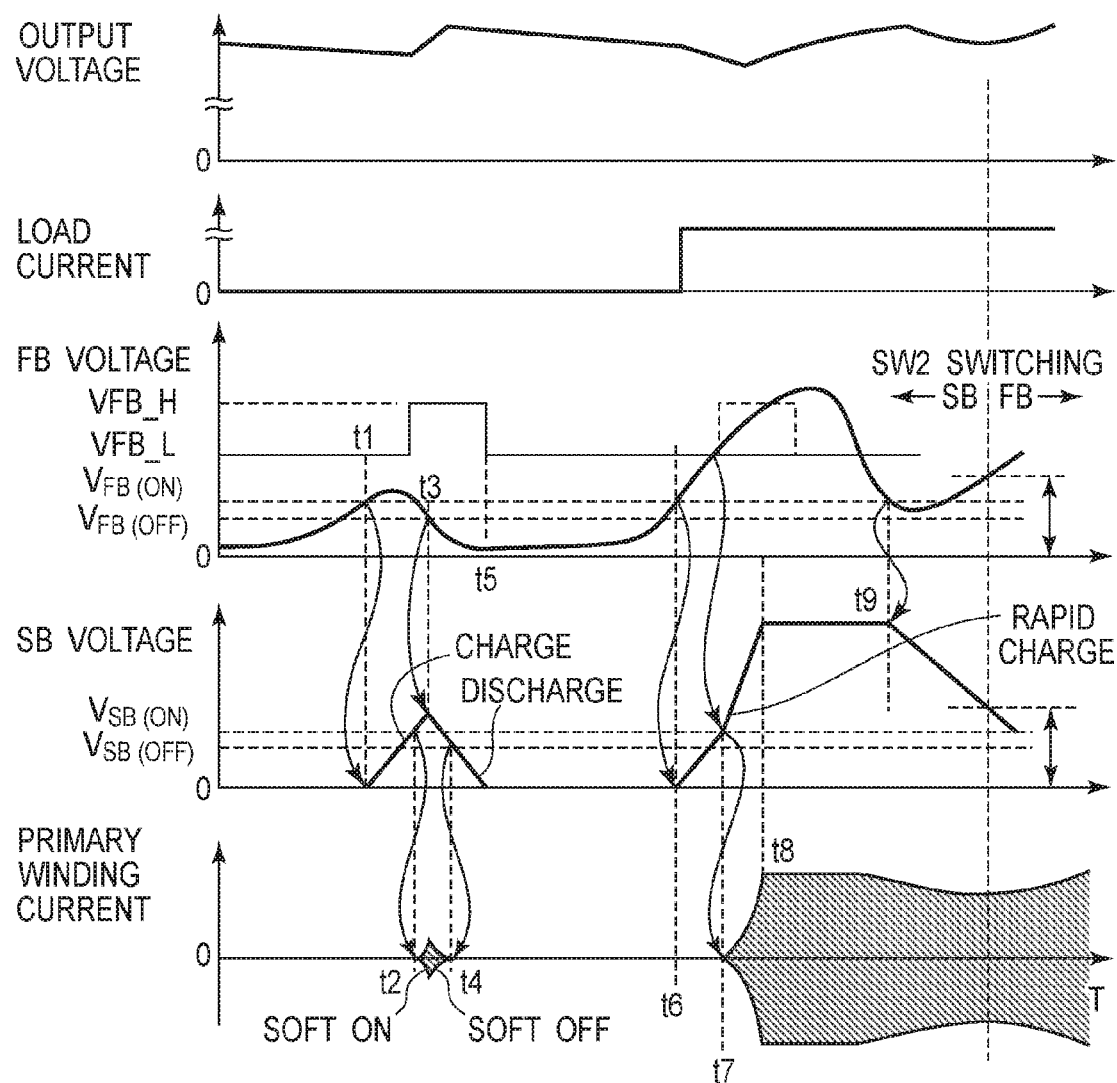

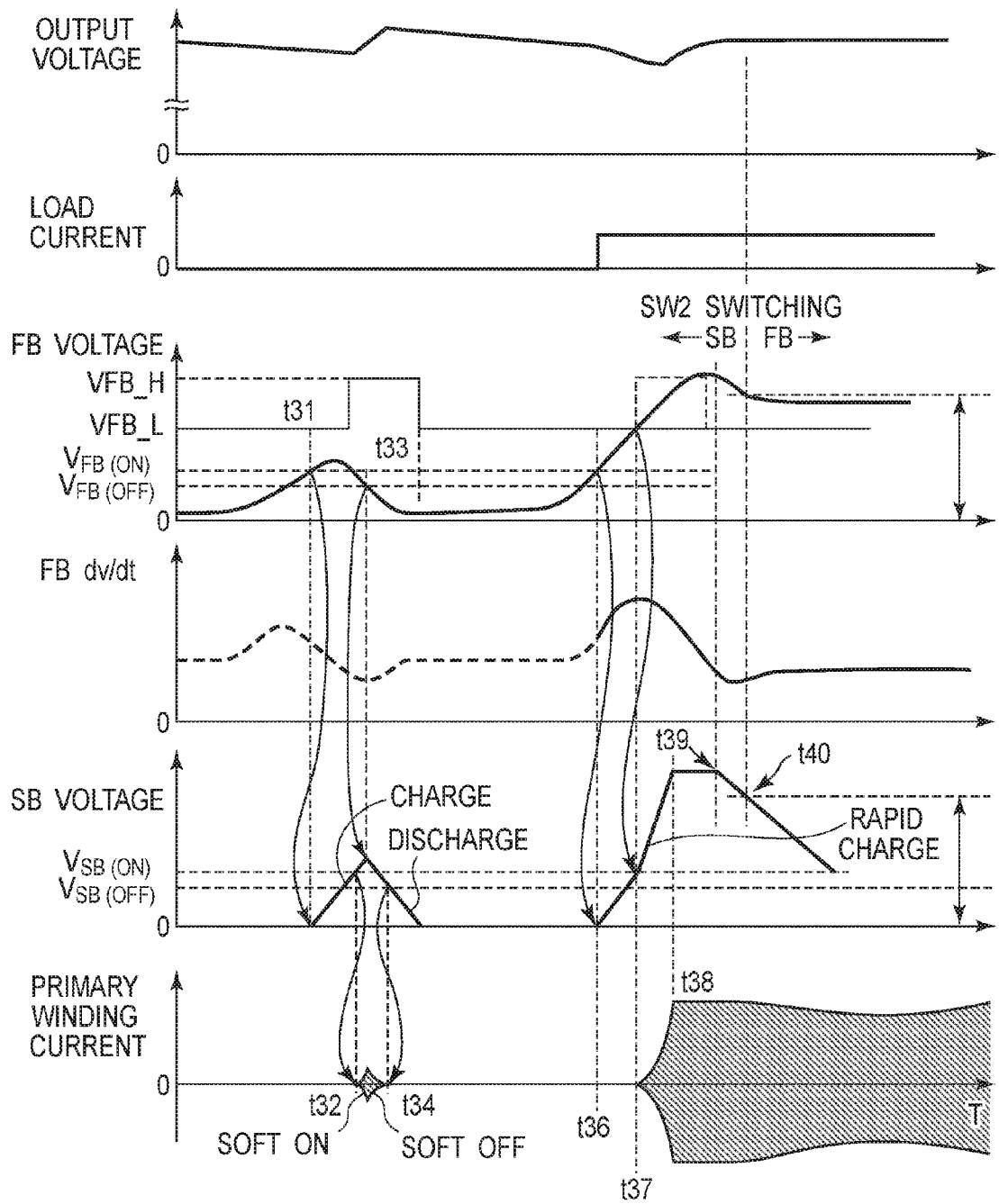

CURRENT RESONANT POWER SUPPLY DEVICE

CROSS REFERENCE TO RELATED APPLICATIONS

This application claims priority under 35 U.S.C. § 119 from provisional Patent Application No. 62/372,051 filed on Aug. 8, 2016, and from provisional Patent Application No. 62/372,029 filed on Aug. 8, 2016, which non-provisional patent application Ser. No. 15/637,714 filed on Jun. 29, 2017 is based upon and claims the benefit of priority from. This application is further related to patent application Ser. No. 14/749,690 filed on Jun. 25, 2015, which based upon and claims the benefit of priority from prior Japanese Patent Application No. 2014-174959 filed on Aug. 29, 2014, and issued as U.S. Pat. No. 9,564,826 on Feb. 7, 2017. The entire contents of all of above are hereby incorporated herein by reference.

BACKGROUND

The present disclosure relates to a current resonant power supply device, and particularly relates to a current resonant power supply device, which can achieve reduced power consumption under light load.

Japanese Patent Application Publication No. 2014-60895 (Patent Literature 1) and Japanese Patent No. 5384973 (Patent Literature 2) disclose current resonant power supply devices that can achieve reduced power consumption under light load.

The current resonant power supply device of Patent Literature 1 judges whether the device is currently in a light load state by comparing a power value detected by the power detection circuit with threshold Vref. Patent Literature 1 discloses a burst oscillation operation that may be performed while controlling the cycle of the burst oscillation if it is judged that the device is currently in the light load state.

The current resonant power supply device of Patent literature 2 detects the phase of current flowing through the switching elements. If the phase of the detected current is smaller than a predefined value, the current resonant power supply device judges that the device is currently in a light load state, and operates in a burst oscillation mode while operating the high side switch and the low side switch at unequal duty ratios.

Meanwhile, when changed to a standby load state, an Inductor Inductor Capacitor (LLC) current resonant system receives a standby signal generated externally, and switches from a normal operation state to a standby state.

Specifically, the standby signal is outputted from a system microcomputer on the secondary side of a transformer and is inputted into a power control integrated circuit (IC) on the primary side of the transformer via a photocoupler. For example, an SB (standby) terminal of the power control IC on the primary side of the transformer receives the standby signal from the photocoupler on the secondary side of the transformer.

The current resonant power supply devices of Patent Literatures 1 and 2 are capable of transitioning to a burst mode upon detection of a light load state.

U.S. Patent Application Publication No. 2016/0065075 (Patent literature 3) discloses a current resonant power supply device that comprises a first switch and a second switch connected in series to both terminals of a DC power source; a series circuit comprising a reactor, a primary winding of a transformer, and a capacitor connected in series, and connected to a node between the first and second switches and first terminal of the DC power source; a rectifier smoothing circuit that rectifies and smoothens a voltage generated across a secondary winding of the transformer and outputs a DC voltage; a control circuit that alternately turns the first and second switches on and off; a voltage detection circuit that detects the DC voltage from the rectifier smoothing circuit; a signal generation circuit that generates a feedback signal based on the DC voltage detected by the voltage detection circuit, and outputs the feedback signal, the feedback signal being for turning the first and second switches on and off; a load current detection circuit that detects load current contained in resonance current flowing through the capacitor; a standby state detection circuit that detects a standby state based on the load current detected by the load current detection circuit and a standby threshold; and a burst oscillation circuit that operates the first and second switches in a burst oscillation mode based on the feedback signal if the standby state is detected.

SUMMARY

One or more embodiments provide a current resonant power supply device that comprises a first switch and a second switch connected in series to both terminals of a DC power source; a series circuit including a reactor, a primary winding of a transformer, and a capacitor connected in series, and connected to a node between the first and second switches and one terminal of the DC power source; a rectifier smoothing circuit that rectifies and smoothens a voltage generated across a secondary winding of the transformer and outputs a DC voltage; a voltage detection circuit that detects the DC voltage from the rectifier smoothing circuit; a signal generation circuit that generates a feedback signal based on the DC voltage detected by the voltage detection circuit, and outputs the feedback signal, the feedback signal for turning the first and second switches on and off; a load current detection circuit that detects load current contained in resonance current flowing through the capacitor; a standby state detection circuit that detects a standby state based on the load current detected by the load current detection circuit and a standby threshold; a burst oscillation circuit that generates a burst oscillation signal based on the feedback signal and turns the first switch element and the second switch element on and off based on the burst oscillation signal when the standby state is detected, wherein the burst oscillation circuit comprises a capacitor and a rapid charge circuit, wherein when the current resonant power supply device returns from standby state to normal state, the rapid charging circuit charges the capacitor after the feedback signal exceeds the cancellation threshold voltage.

BRIEF DESCRIPTION OF THE DRAWINGS

FIG. 3 is a chart illustrating waveforms at a time of a burst oscillation operation of a current resonant power supply device shown in FIG. 1;

FIG. 8 is a chart illustrating waveforms at a time of a burst oscillation operation of a current resonant power supply device shown in FIG. 7.

DETAILED DESCRIPTION

Figure 1:
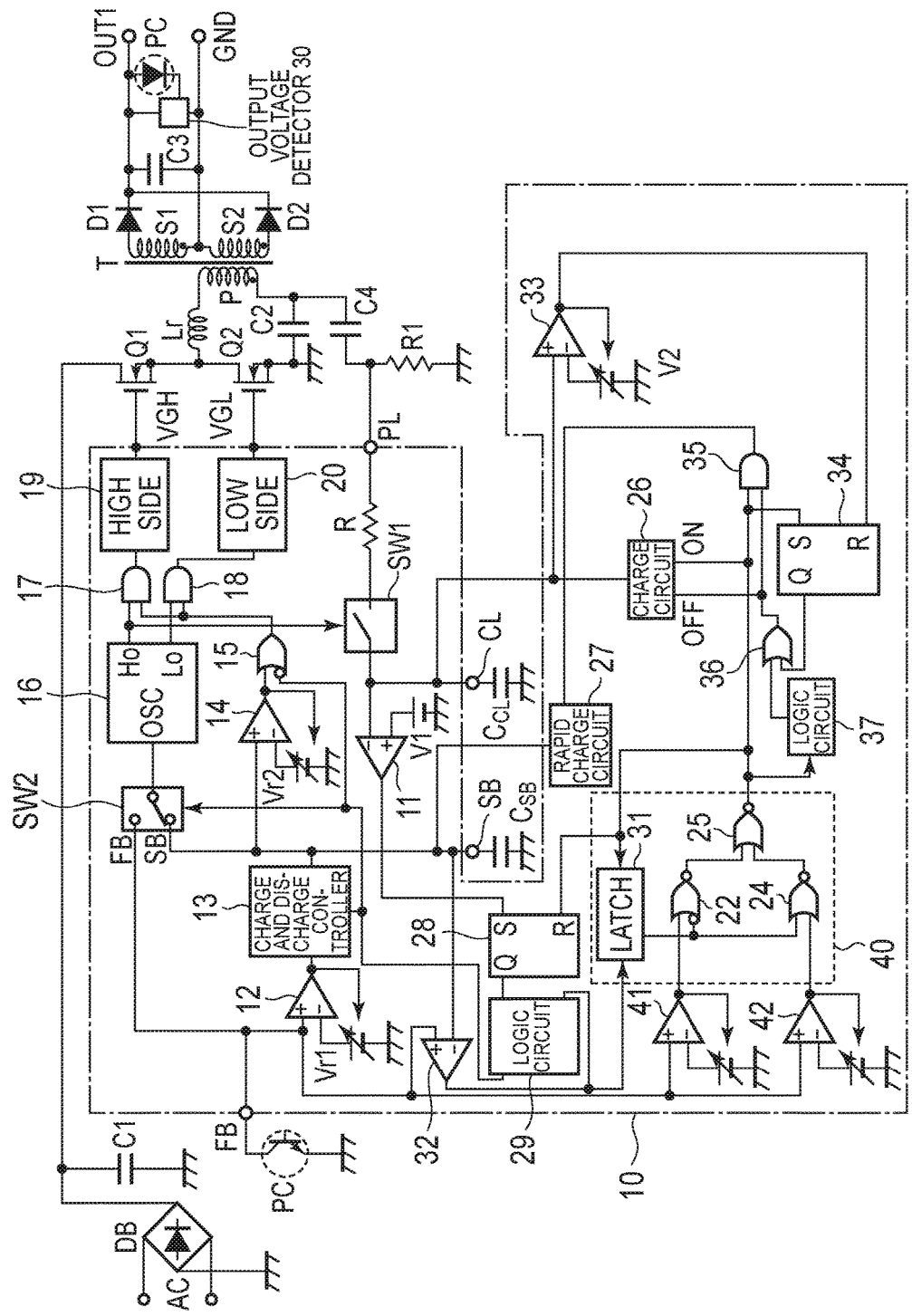
FIG. 1 illustrates a current resonant power supply device in accordance with one or more embodiments.

Embodiments of current resonant power supply devices are explained with reference to the drawings. In the respective drawings referenced herein, the same constituents are designated by the same reference numerals and duplicate explanations concerning the same constituents is omitted for ease of description. All of the drawings are provided to illustrate respective examples only. No dimensional proportions in the drawings, unless otherwise indicated, shall impose a restriction on the various embodiments. For this reason, specific dimensions, dimensional relationships, ratios and the like should be interpreted with the following descriptions taken into consideration. In addition, the drawings may include parts whose dimensions, dimensional relationships and ratios are different from one drawing to another.

FIG. 1 is a diagram illustrating a configuration of a current resonant power supply device according to a first embodiment. The current resonant power supply device illustrated in FIG. 1 includes full-wave rectifier circuit DB, capacitor C1, control circuit 10, reactor Lr, switching elements Q1 and Q2, transformer T, diodes D1 and D2, capacitors C2 to C4, photocoupler PC, output voltage detector 30, capacitors $C_{CL}$ and $C_{SB}$, resistor R1. Photocoupler PC may apply a signal from a phototransistor to the feedback (FB) terminal of the control circuit 10 as will be further described below.

Full-wave rectifier circuit DB is configured to perform full-wave rectification of an AC voltage input and to output, via capacitor C1, a full-wave rectified voltage to switching element Q1 (example of a first switch) and switching element Q2 (example of a second switch) that are connected in series. Switching elements Q1 and Q2 each include a switching element such as a MOSFET.

A series circuit including reactor Lr for current resonance, primary winding P of transformer T, and capacitor C2 for current resonance is connected between the drain and source of switching element Q2. Secondary winding S1 and secondary winding S2 of transformer T are connected in series. The anode of diode D1 is connected to a first terminal of secondary winding S1. The anode of diode D2 is connected to a first terminal of secondary winding S2.

The cathode of diode D1 and the cathode of diode D2 are connected to a first terminal of capacitor C3, the anode of a photodiode of photocoupler PC, and a first terminal of output voltage detector 30. The second terminal of secondary winding S1 and the second terminal of secondary winding S2 are connected to the second terminal of capacitor C3 and the second terminal of output voltage detector 30.

Switching element Q1 and switching element Q2 may be alternately turned on and off according to a control signal output from control circuit 10. Output voltage detector 30 is configured to detect an output voltage across capacitor C3, and output the detected voltage to the FB terminal of primary-side control circuit 10 as a feedback signal via photocoupler PC.

Control circuit 10 alternately turns switching element Q1 and switching element Q2 on and off based on a feedback signal from output voltage detector 30. The first terminal of capacitor C4 is connected to the first terminal of primary winding P of transformer T and the first terminal of capacitor C2, the first terminal of resistor R1 is connected to the second terminal of capacitor C4, and the second terminal of resistor R1 is grounded.

Control circuit 10 includes comparators 11, 12, 14, 32, 33, 41, and 42, charge and discharge controller 13, switch circuit SW2, logic circuit 15, oscillator (OSC) 16, AND circuits 17 and 18, high side driver 19, low side driver 20, selector 40, flip flop circuit 28 and 34, charge circuit 26, rapid charge circuit 27, and logic circuits 29 and 37. Control circuit 10 may be implemented by a single integrated circuit (IC). Control circuit 10 may be implemented by a plurality of integrated circuits.

Control circuit 10 includes: a $V_{GH}$ terminal connected to the gate of switching element Q1, a $V_{GL}$ terminal connected to the gate of switching element Q2, a PL terminal connected to the first terminal of resistor R1, a CL terminal connected to capacitor $C_{CL}$, an SB terminal connected to capacitor $C_{SB}$, and the FB terminal connected to the collector of the phototransistor in photocoupler PC.

Selector 40 includes logic circuits 22, 24 and 25, and latch circuit 31. Selector 40 inputs signals from comparators 41 and 42 and outputs to flip flop circuit 28.

The cancellation of burst oscillation is now described. Cancellation after the burst oscillation operation of switching elements Q1 and Q2 may be based on a feedback signal when a standby state is detected.

Comparator 41 (an example of first burst operation cancellation threshold voltage comparator) compares a first burst operation cancellation threshold voltage set higher than a voltage of the feedback signal when the load current reaches the standby threshold to the feedback signal voltage and outputs an output a signal to selector 40 based on the results of the comparison.

Comparator 42 (an example of a second burst operation cancellation threshold voltage comparator) compares a second burst operation cancellation threshold voltage set lower than the voltage of the feedback signal if the load current reaches the standby threshold and higher than a voltage of the feedback signal during a non-oscillation period of the burst oscillation operation to the feedback signal voltage and outputs an output signal to selector 40 based on the results of the comparison.

Selector 40 detects one of the output signals from comparators 41 and 42 and holds information of cancellation condition at the first or second burst operation cancellation threshold voltage. Selector 40 outputs a high (H) signal to a reset terminal of flip flop circuit 28. Flip flop circuit 28 switches states based on a signal inputted to the reset terminal. An output of a logic circuit 27 causes the oscillating frequency to be switched. Selector 40, flip flop circuit 28 and logic circuit 27 (an example of standby cancellation circuit) generate a signal to cancel the standby state based on the signals from comparators 41 and 42. Switch SW2 receives the signal to cancel the standby state and switches the state from standby state to the normal operation state.

Next, the current resonant power supply device is described. In accordance with an automatic standby function, the current resonant power supply device switches from a normal operation state to a standby state by detecting a load of a standby state by controller 10 without receiving any standby signal, such as an external standby signal from the outside. The load in the standby state is detected using information on current flowing through the primary wiring of the transformer.

In an LLC current resonance system, the current flowing through the primary winding of the transformer contains cyclic current (current not to be sent to a secondary side of the transformer) and load current (current in proportion to output current). The current resonant power supply device can detect the standby state by retrieving only information on the load current from the current of the primary winding.

One or more embodiments provides rapid charge technology of SB terminal, which may be performed to improve the responsiveness at a return from the standby mode to the normal state. In the standby mode, the frequency may be controlled using SB terminal. Just after detecting the normal state return signal, for example, SB terminal is quickly charged to be around 6 V. Charging the SB terminal reduces the oscillation frequency and causes operation with the maximum ON range. Here, the period of continuing the maximum ON range (the period of continuing the charge) may be determined by the timing of FB signal returning from the secondary side of the control circuit 10 (the timing of the overshoot coming to an end).

In an exemplary automatic standby system, the frequency is switched using SB terminal (in the standby state), which is a dedicated standby terminal, and FB terminal (in the normal state). Considering the load responsiveness, the system switches to the normal oscillation as soon as detecting the crossing of the standby cancellation threshold of the standby signal level, while controlling the oscillation frequency using the dedicated standby terminal. The system discharges the dedicated standby terminal at the time the feedback signal returns to the normal state. If the voltage at the dedicated standby terminal crosses the FB voltage threshold, the system switches the frequency control to FB terminal. Only the frequency control terminal is provided with a certain period of delay after the standby cancellation timing of the IC when switching from the standby state to the normal state. An internal timer may be provided for generating the certain period of delay. Alternatively, the time taken for the voltage to reach CL charge stop threshold V2 (standby threshold V1) of comparator 33 to cause comparator 33 to invert the output may be set sufficiently long.

Figure 2A:
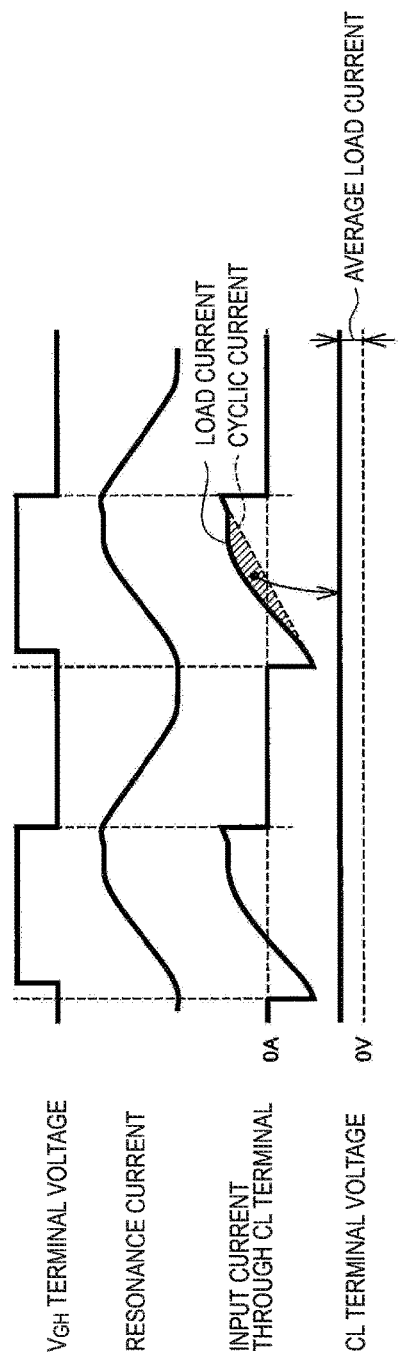
FIGS. 2A and 2B are charts illustrating operations of parts of a current resonant power supply device shown in FIG. 1 under light load and heavy load.
Figure 2B:
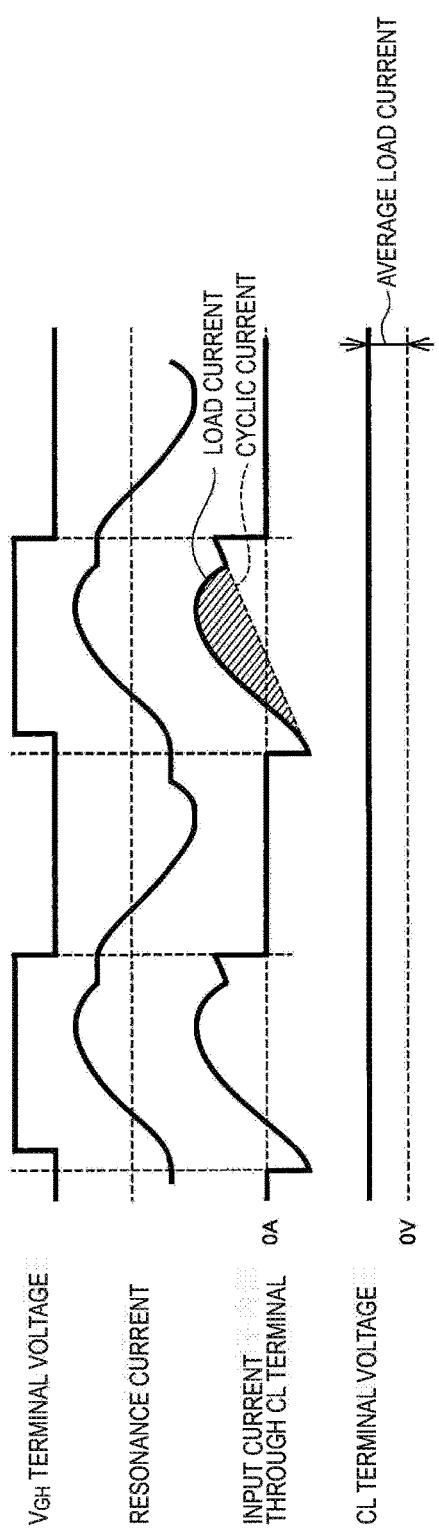

FIGS. 2A and 2B are charts illustrating operations of parts of the current resonant power supply device according to a first embodiment under light load and heavy load and under voltage pulse signal timing conditions. FIG. 2A illustrates waveforms under light load and FIG. 2B illustrates waveforms under heavy load. In general, the oscillating cycle under heavy load may be longer than that under light load.

As illustrated in FIGS. 2A and 2B, resonance current flows through primary winding P of transformer T upon application of a $V_{GH}$ terminal voltage resulting in the generation of a pulse signal onto the gate of switching element Q1. The resonance current is extracted by capacitor C4 (equivalent to a load current detection circuit of the embodiments) and inputted to the CL terminal via switch SW1 of control circuit 10, so that input current through the CL terminal is obtained. The input current through the CL terminal contains load current and cyclic current similar to the current of the primary winding of the transformer described above.

As illustrated in FIGS. 2A and 2B, in the case of taking in the input current through the CL terminal during an on period of switching element Q1, the cyclic current flows in the same amount on the positive and negative sides as represented by the waveforms and therefore becomes zero on average. On the other hand, the load current is integrated over the on period by capacitor $C_{CL}$ connected to the CL terminal, and thus a CL terminal voltage being a DC voltage equivalent to an average load current value is obtained. Since the CL terminal voltage reflects information on the load current, the CL terminal voltage (or average load current) under heavy load is higher than that under light load. Note that capacitors C4 and $C_{CL}$ may correspond to the load current detection circuit of the embodiments.

Standby detection comparator 11 (example of a standby state detection circuit) will now be described. Standby detection comparator 11 is configured to receive input of a voltage across capacitor $C_{CL}$ at its inverting input terminal and input of standby threshold V1 at its non-inverting input terminal. If the voltage across capacitor $C_{CL}$ is equal to or higher than standby threshold V1, standby detection comparator 11 detects a normal operation state, and thus outputs L level to the set terminal (S) of the flip flop circuit 28, causing an output from the Q terminal of the flip flop circuit 28 to be input to a terminal of the logic circuit 29. The logic circuit 29 receives a signal from the Q terminal of the flip flop circuit 28 and a signal from the comparator 32. The logic circuit outputs a signal to switch SW2, which switches to feedback terminal (FB terminal). The logic circuit 29 may include a flip flop circuit.

In this case, the feedback signal inputted to the FB terminal is outputted to oscillator (OSC) 16 via switch SW2. The oscillator (OSC) 16 controls the oscillating cycle (frequency) of a pulse signal according to the value of the feedback signal and generates a high-side pulse signal and a low-side pulse signal. The signal levels of the high-side (Ho) pulse signal and the low-side (Lo) pulse signal, may change between H level and L level alternately with time intervals between transitions.

For the purposes of this section "AND" is used as a verb to refer to a logical operation in which inputs to a logic element are combined in a Boolean AND operation. AND circuit 17 is configured to AND the high-side (Ho) pulse signal and an output from logic circuit 15 and send the result of the AND operation as a logic output to high side driver 19. AND circuit 18 is configured to AND the low-side (Lo) pulse signal and the output from logic circuit 15 and send the result of the AND operation as a logic output to low side driver 20.

High side driver 19 is configured to turn switching element Q1 on or off in response to the result of the AND operation output from AND circuit 17. Low side driver 20 is configured to turn switching element Q2 on or off in response to the result of the AND operation output from AND circuit 18.

In the case where standby detection comparator 11 detects the normal operation state, logic circuit 15 outputs H level to AND circuits 17 and 18, and hence switching element Q1 and switching element Q2 are alternately turned on and off.

Next, if the voltage across capacitor $C_{CL}$ is lower than standby threshold V1, standby detection comparator 11 detects a standby state, and thus outputs H level to the set terminal (S) of flip flop circuit 28, causing an output from the Q terminal of the flip flop circuit 28 to be input to the set terminal (S) of the logic circuit 29 causing an output from the Q terminal of the flip flop circuit 29 to be input to SW2, which causes switch SW2 to switch to standby terminal (SB terminal).

When switch SW2 is switched to the feedback terminal, (FB terminal), Comparator 12 is configured to receive input of a feedback signal from the FB terminal at its non-inverting input terminal and input of first reference voltage Vr1 at its inverting input terminal, and turn on charge and discharge controller 13 if the feedback signal is equal to or higher than first reference voltage Vr1.

However, when SW2 is switched to the standby terminal (SB terminal), Capacitor $C_{SB}$ is connected to the SB terminal of switch SW2 and an output terminal of charge and discharge controller 13. Charge and discharge controller 13 is configured to charge capacitor $C_{SB}$ while it is in an on state. Capacitor $C_{SB}$ is connected to an output terminal of rapid charge circuit 27. Rapid charge circuit 27 charges capacitor $C_{SB}$ rapidly on cancelling the standby state. Capacitor $C_{SB}$ is connected to inverting terminal of comparator 32. Non-inverting terminal of comparator 32 is connected to FB terminal. Comparator 32 compares terminal voltage of capacitor $C_{SB}$ with FB terminal voltage and outputs clock signal to latch 31 of selector 40.

The non-inverting input terminal of comparator 14 is connected to first terminal of capacitor $C_{SB}$, the SB terminal of switch SW2, and an output terminal of charge and discharge controller 13. Comparator 14 corresponds to a burst oscillation operation unit, and is configured to receive input of a voltage of capacitor $C_{SB}$ at its non-inverting input terminal and input second reference voltage Vr2 at its inverting input terminal. If the voltage of capacitor $C_{SB}$ is equal to or higher than second reference voltage Vr2, comparator 14 outputs H level to logic circuit 15.

In this case, logic circuit 15 outputs H level to AND circuits 17 and 18, and the pulse signals of oscillator (OSC) 16 are thereby outputted to high side driver 19 and low side driver 20. Thus, switching element Q1 and switching element Q2 are alternately turned on and off.

Then, if the feedback signal input to the non-inverting terminal of comparator 12 becomes lower than first reference voltage Vr1, the output of comparator 12 goes to L level and charge and discharge controller 13 is set at an off state and therefore capacitor $C_{SB}$ is discharged. Then, if the voltage of capacitor $C_{SB}$ becomes lower than second reference voltage Vr2, comparator 14 outputs L level to logic circuit 15 to stop output from oscillator (OSC) 16. The burst oscillation operation of the switching operation can be achieved by the repetition of the above processes.

In other words, comparator 12 charges or discharges capacitor $C_{SB}$ via charge and discharge controller 13 based on a comparison between the feedback signal and first reference voltage Vr1, which can determine an output voltage variation range during the standby state.

Next, the burst oscillation operation is described in detail with reference to a chart illustrated in FIG. 3. The voltage value of reference voltage Vr1, which is input to the inverting terminal of comparator 12 corresponds to the oscillation start voltage VFB(ON) and the oscillation stop voltage VFB(OFF) shown in FIG. 3. The voltage value of reference voltage Vr2, which is input to the inverting terminal of comparator 14 corresponds to the oscillation start voltage VSB(ON) and the oscillation stop voltage VSB(OFF) shown in FIG. 3. In FIG. 3, First, if the SB terminal voltage becomes equal to or lower than the oscillation stop voltage VSB(OFF) and if the FB terminal voltage becomes the oscillation stop voltage VFB(OFF), the switching operation stops and the output voltage decreases (t1). As the output voltage decreases, the FB terminal voltage increases. If the FB terminal voltage reaches oscillation start voltage VFB(ON), the voltage of the non-inverting input terminal of comparator 12 becomes high, and hence comparator 12 outputs an H level signal to charge and discharge controller 13 to charge capacitor $C_{SB}$ at the SB terminal with a constant current value. The SB terminal voltage thereby increases with a constant slope (t1 to t3). The voltage value of reference voltage Vr1, which is input to the inverting terminal of comparator 12 is also decreased by a certain amount once the output becomes H level.

Next, if the SB terminal voltage reaches oscillation start voltage VSB(ON), the switching operation restarts (t2). Here, oscillator OSC 16 determines a switching frequency based on the SB terminal voltage. In the state where the SB terminal voltage is low, oscillator OSC outputs a high oscillating frequency. The oscillator OSC 16 decreases the oscillating frequency along with an increase in the SB terminal voltage. The oscillating frequency in the state of the low SB terminal voltage is higher than a frequency at the peak of the resonance point of the series circuit including reactor Lr for current resonance, primary winding P of transformer T, and capacitor C2. Accordingly, current flowing through the series circuit is small at first, and then increases gradually as the oscillating frequency gets closer to the frequency of the resonance point along with the increase in the SB terminal voltage, so that the output voltage increases gradually (e.g., referred to as "soft—on").

As the output voltage increases, the FB terminal voltage is decreased gradually by the operation of output voltage detector 30 via photocoupler PC. If the FB terminal voltage falls below the value of reference voltage Vr1 (the value decreased by the certain amount), the output from comparator 12 is inverted into L level, and thus charge and discharge controller 13 discharges capacitor $C_{SB}$ at the SB terminal with a constant current value (t3). The SB terminal voltage thereby decreases gradually, and the switching operation stops once the voltage becomes equal to or lower than oscillation stop voltage VSB(OFF) again (t4). Here, as the SB terminal voltage decreases, the oscillating frequency gets farther from the frequency at the peak of the resonance point of the series circuit including reactor Lr for current resonance, primary winding P of transformer T, and capacitor C2, so that the current flowing through the series circuit is decreased gradually and shut off (e.g. referred to as "soft—off").

Next, the transition from the burst oscillation operation to the normal state is described in detail with reference to the chart illustrated in FIG. 3. First, if the SB terminal voltage becomes equal to or lower than oscillation stop voltage VSB(OFF), and if the FB terminal voltage becomes equal to oscillation stop voltage VFB(OFF), the switching operation stops (t4 to t6). In this state, if a sudden load change occurs to increase the load current rapidly and decrease the output voltage, the FB terminal voltage increases. If the FB terminal voltage reaches VFB_L, the voltage at the non-inverting terminal of comparator 42 increases and outputs an H level signal to selector 40. Selector 40 outputs an H level signal to reset terminal R of flip-flop circuit 28. Selector 40 resets the flip-flop circuit 28 and inputs an H level signal to latch 31 at the same time, and fixes a clock to prevent a malfunction.

Selector 40 also turns on rapid charge circuit 27 and charge circuit 26 to charge capacitor $C_{SB}$ at the SB terminal and capacitor $C_{CL}$ at the CL terminal with a constant current value. The charging of capacitors $C_{SB}$ increase the SB terminal voltage with a constant slope. If the SB terminal voltage exceeds oscillation start voltage VSB(ON), the switching operation starts. As the SB terminal voltage increases further after exceeding the FB terminal voltage, the oscillation frequency of oscillator 16 is decreased. As a result, the current flowing through the series circuit Lr, C2 increases, and the output voltage increases (t7 to t8).

Note that rapid charge circuit 27 stops its operation after outputting a constant current for a specified period. An operation start point and an operation stop point may be determined by the thresholds of comparators 41 and 42, or any additional comparators.

Figure 4:
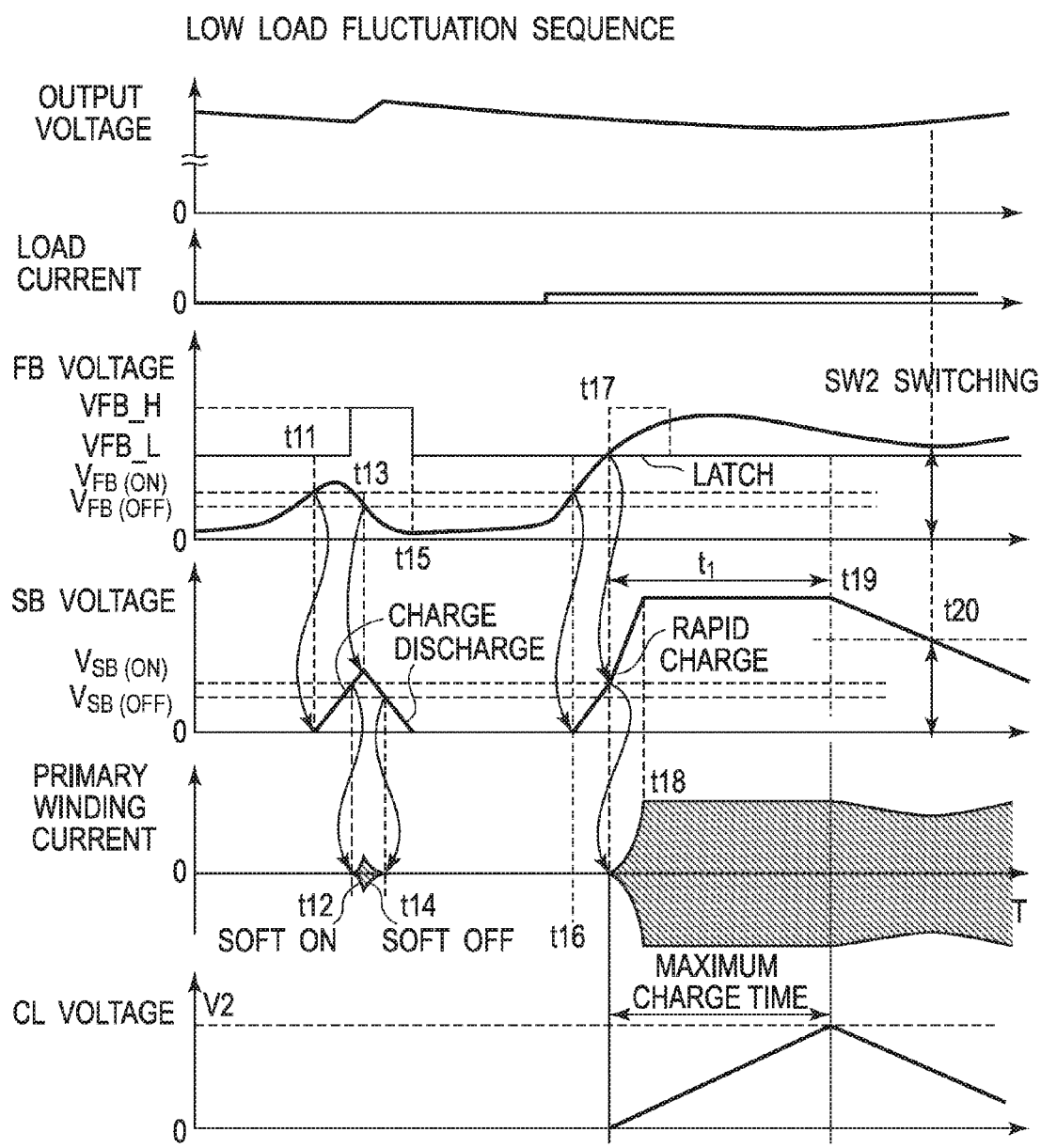
FIG. 4 is a chart illustrating waveforms at the time of a burst oscillation operation of the current resonant power supply device in low load fluctuation.

FIG. 4 is a diagram that illustrates a case where a small load fluctuation occurs in the standby mode, which is described below.

If a load fluctuation is small, the operation stop signal for the specified period determined by the comparators is sometimes not detected. For this case, the maximum charge time may be determined by another method. For example, when a small load fluctuation causes selector 40 to output an H level signal, the voltage at CL terminal also gradually increases with a constant slope. The time taken for the CL terminal voltage to reach a desirably set value for CL charge stop threshold V2 (>standby threshold V1) of comparator 33 to invert the output is set sufficiently long, and the maximum charge period may be set equal to this time (t17 to t19). The time may be set using a timer included in the IC. By establishing a maximum charge period, the voltage across capacitor $C_{CL}$ sufficiently exceeds standby threshold V1, and has an effect to prevent a decrease of CL terminal from causing the standby mode again.

Next, comparator 32 compares the FB terminal voltage and the SB terminal voltage. After rapid charge circuit 27 stops charging, the SB terminal voltage gradually decreases. If the SB terminal voltage becomes lower than the FB terminal voltage, comparator 32 outputs a high level H to reset a terminal of the logic circuit 29 to reset it. This operation selects FB terminal in switch SW2 and transitions the state into the normal state. In this case, if the SB terminal voltage and the FB terminal voltage become almost the same, switch SW2 changes from SB terminal to FB terminal. Accordingly, the oscillation frequency of oscillator 16 is switched smoothly. Since the oscillation frequency transitions smoothly, the switching operation can also transition without a change. Thus, compared to conventional methods and techniques in which rapid transitions from lower to higher oscillation frequency at the transition from the standby state to the normal state, disclosed embodiments may alleviate problems associated with an occurrence of a hard switching caused by a forceful transition of the oscillation frequency, or problems associated with taking a long time to transition from the high frequency to the frequency in the normal state.

As above, the description has been provided for the transition from the state where the switching operation is suspended to the normal state, which occurs if the SB terminal voltage becomes equal to or lower than oscillation stop voltage VSB(OFF) and if the FB terminal voltage becomes equal to or lower than oscillation stop voltage VFB(OFF).

Similarly, even in the case of the transition to the normal state from the state where the switching operation has started, which occurs if the FB terminal voltage exceeds oscillation start voltage VFB(ON) and if the SB terminal voltage becomes equal to or higher than oscillation start voltage VSB(ON), the transition from the standby state to the normal state also occurs in the same manner except that the operation of comparator 42 replaces that of comparator 41.

Furthermore, the transition from the standby state to the normal state also occurs in the same manner except that the operation of comparator 42 replaces that of comparator 41 at states below.

1) FB terminal voltage VFB<VFB(OFF) and SB terminal voltage VSB>VSB(ON)
2) FB terminal voltage VFB>VFB(ON) and SB terminal voltage VSB>VSB(ON)
3) FB terminal voltage VFB>VFB(ON) and SB terminal voltage VSB<VSB(OFF)

Here, if a sudden load change occurs, the overshoot of FB voltage is large. Accordingly, in addition to the thresholds for comparators (1.1 V and 0.6 V) for detecting the return to the normal state, a FB comparator for detecting a dynamic load with a higher threshold (for example, around 3.4 V or 3 V) may be added to optimize the charge period.

To start the operation with the maximum ON range, the signal may be switched to the maximum ON range instead of the rapid charge.

Figure 5:
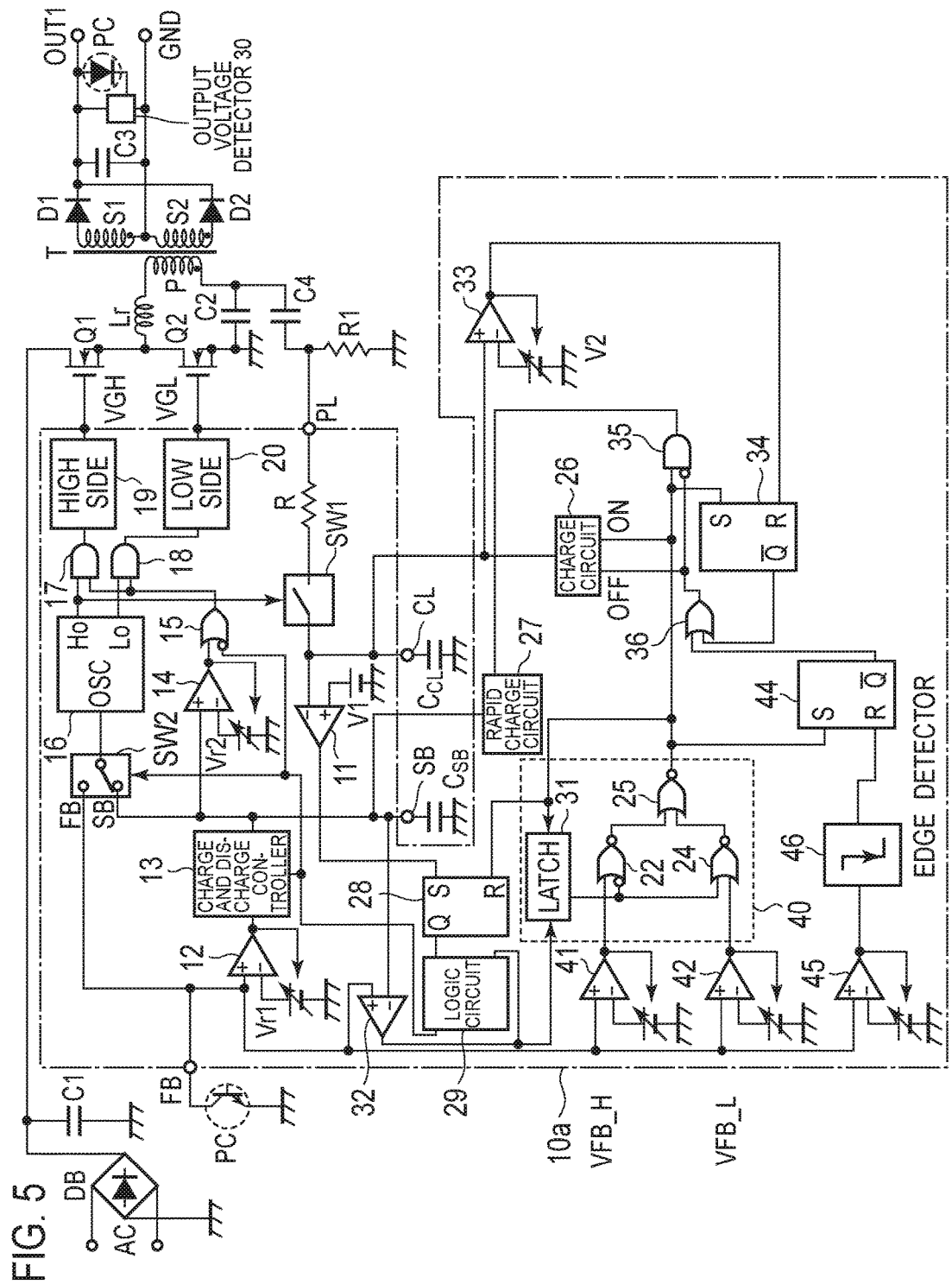
FIG. 5 illustrates a current resonant power supply device in accordance with one or more embodiments.

FIG. 5 is a diagram illustrating a configuration of a current resonant power supply device according to a third embodiment. In this embodiment, the current resonant power supply device includes: comparator 45 that receives input of FB terminal voltage, compares the FB terminal voltage with variable voltage, and outputs a comparison signal; inversion detection circuit (edge detector) 46 that receives input of the comparison signal and detects inversion of comparator 45; and SR flip flop circuit 44. Comparator 45 is connected to the FB terminal and inversion detection circuit 46. Comparator 45 is a comparator that has a threshold different from those of comparators 41 and 42. Here, the threshold of comparator 45 may be higher than the thresholds of comparators 41 and 42. Comparator 45 receives input of the FB terminal voltage and the variable voltage, and compares these FB terminal voltage and variable voltage with each other. Comparator 45 outputs a comparison signal. Inversion detection circuit 46 receives input of the comparison signal and detects inversion of the comparison signal. When detecting the inversion, inversion detection circuit 46 outputs an inversion detection signal. This time point is used as the trigger to terminate charge. This charge terminating trigger signal is inputted to logic circuit 44. Thereafter, through logic circuits and the like, SW2 switches from SB to FB. This allows optimum accommodation of load fluctuation.

Figure 6:
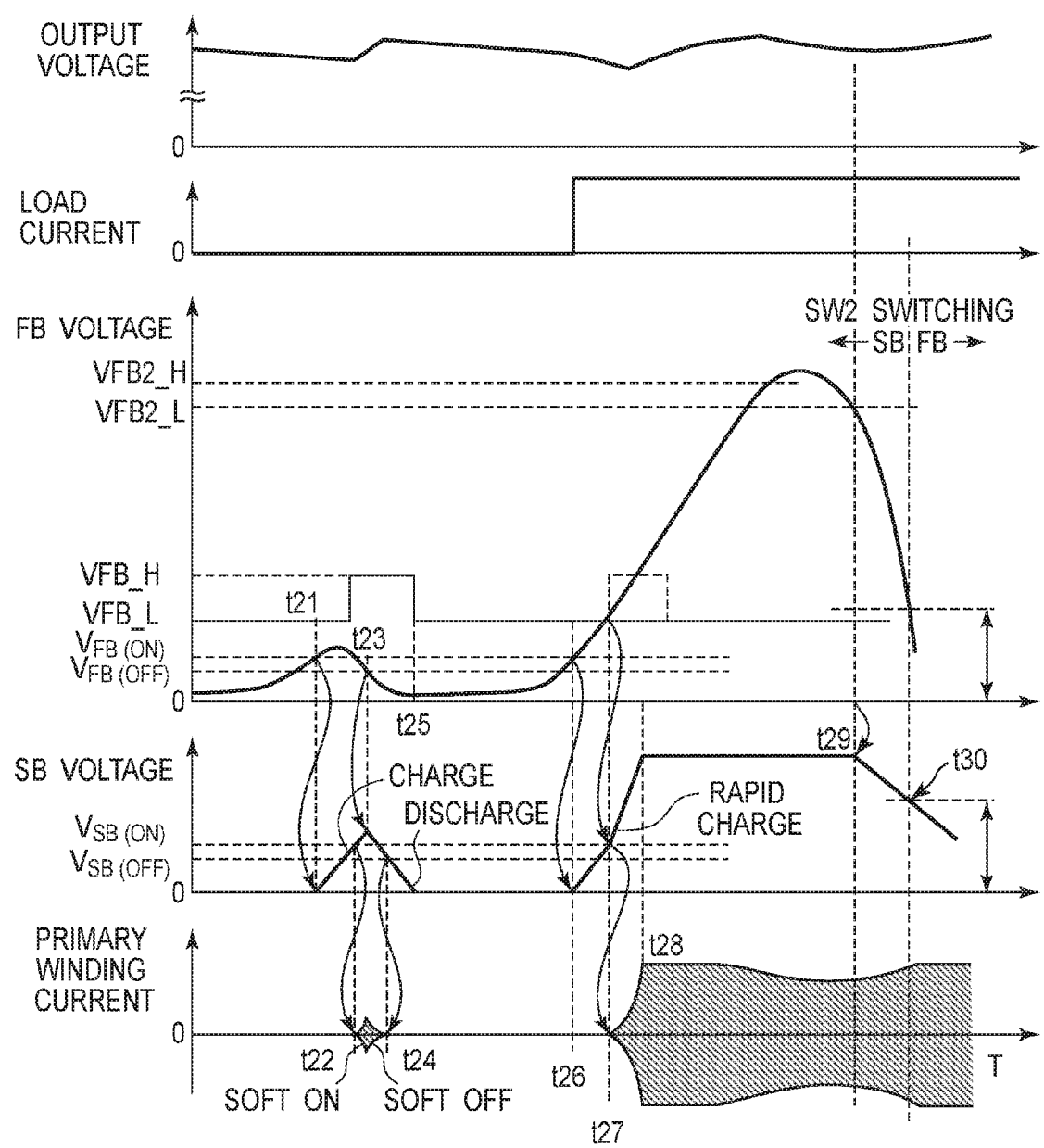
FIG. 6 is a chart illustrating waveforms at a time of a burst oscillation operation of a current resonant power supply device shown in FIG. 5.

FIG. 6 is a chart illustrating waveforms at a time of burst oscillation operation of the current resonant power supply device. The detection of the timing of terminating charge based on the inversion of comparator 45 will be described with reference to FIG. 6.

The FB terminal voltage in the standby mode changes as illustrated in FIG. 6 in response to the increase of the output voltage. In this embodiment, the FB terminal voltage may be operated around 0 to 1 V. Control circuit 10a performs intermittent oscillation in which control circuit 10a alternately repeats a short oscillation period and a long non-oscillation period. This causes the FB terminal voltage to undergo overshoot and then decrease during the oscillation period, and causes the voltage to gradually increase during the non-oscillation period.

In this standby mode state, if the load current increases due to a sudden load change, the output voltage decreases and the FB terminal voltage increases. Here, comparator 45 is supposed to have thresholds of VFB2_L and VFB2_H. Comparator 45 receives inputs of the FB terminal voltage and the variable voltage and compares these FB terminal voltage and variable voltage. When the FB terminal voltage increases and exceeds threshold voltages VFB2_L and VFB2_H, and then becomes lower than or equal to threshold voltage VFB2_L (t29), comparator 45 inverts and outputs the comparison signal. Inversion detection circuit 46 receives input of the comparison signal, and detects the inversion of the comparison signal. This time point of detecting the inversion of the comparison signal (t29) is used as the trigger to terminate charge. This charge terminating trigger signal is inputted into logic circuit 44, and through circuits, the frequency of OSC16 is switched to the FB control by switch SW2 (t30). This achieves transition without sudden change of the oscillation frequency.

Here, another embodiment of the first embodiment will be described with reference to FIGS. 1 and 4. In this embodiment, capacitor $C_{CL}$ is charged, and the time point when the CL terminal voltage becomes the threshold voltage V2 (t19) is detected. This time point (t19) is used as the trigger to terminate charge. At the time point (t20), the frequency of OSC16 is switched to the FB control by switch SW2. This achieves transition without sudden change of the oscillation frequency.

Figure 7:
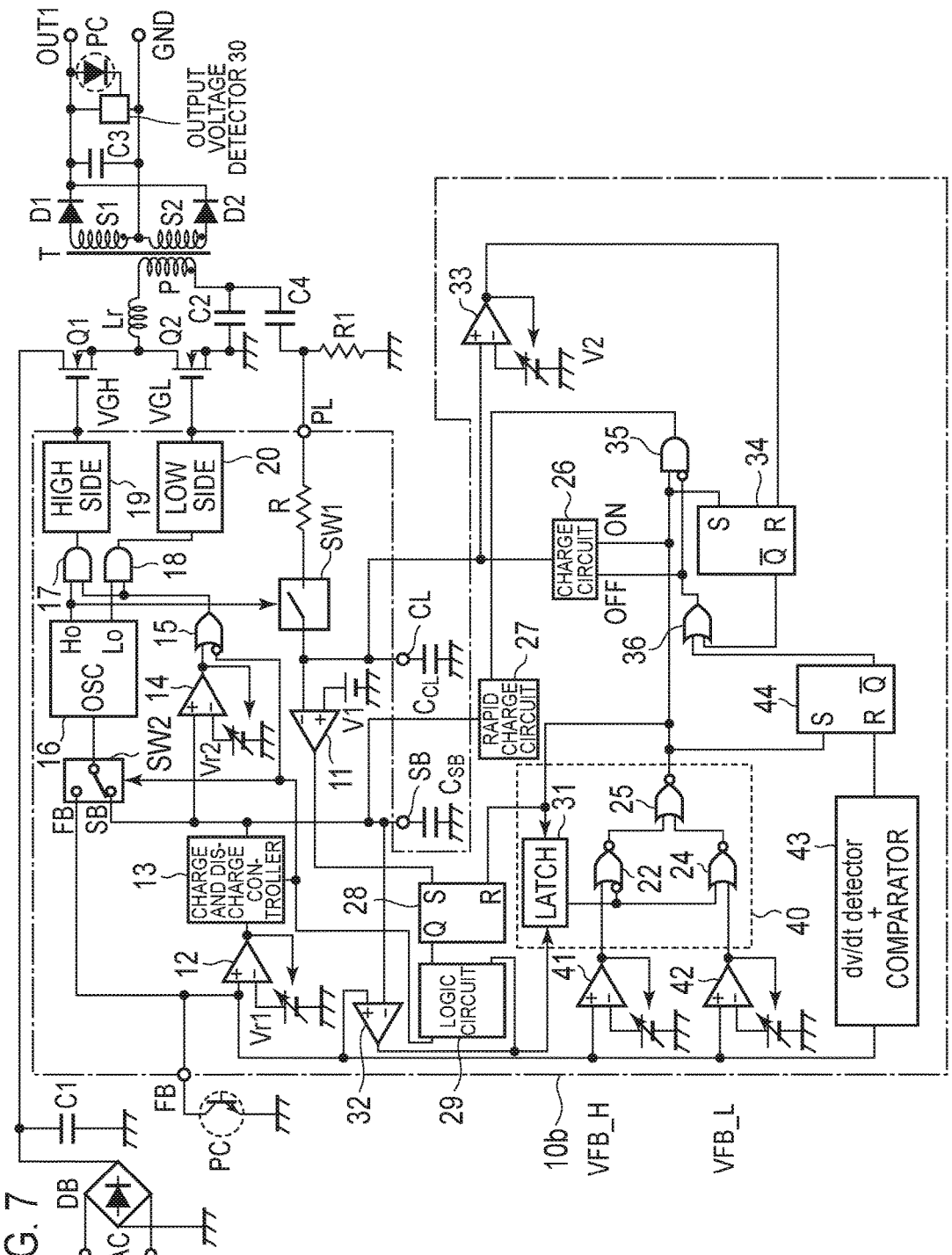
FIG. 7 illustrates a current resonant power supply device in accordance with one or more embodiments.

FIG. 7 is a diagram illustrating a configuration of a current resonant power supply device according to a second embodiment. The current resonant power supply device illustrated in FIG. 7 includes full-wave rectifier circuit DB, capacitor C1, control circuit 10b, reactor Lr, switching elements Q1 and Q2, transformer T, diodes D1 and D2, capacitors C2 to C4, photocoupler PC, output voltage detector 30, capacitors $C_{CL}$ and $C_{SB}$, resistor R1, and selector 40.

Full-wave rectifier circuit DB is configured to perform full-wave rectification of an AC voltage input and to output, via capacitor C1, a full-wave rectified voltage to switching element Q1 (example of a first switch) and switching element Q2 (example of a second switch) that are connected in series. Switching elements Q1 and Q2 each include a switching element such as a MOSFET.

A series circuit including reactor Lr for current resonance, primary winding P of transformer T, and capacitor C2 for current resonance is connected between the drain and source of switching element Q2. Secondary winding S1 and secondary winding S2 of transformer T are connected in series. The anode of diode D1 is connected to a first terminal of secondary winding S1. The anode of diode D2 is connected to a first terminal of secondary winding S2.

The cathode of diode D1 and the cathode of diode D2 are connected to a first terminal of capacitor C3, the anode of a photodiode of photocoupler PC, and a first terminal of output voltage detector 30. The second terminal of secondary winding S1 and the second terminal of secondary winding S2 are connected to the second terminal of capacitor C3 and the second terminal of output voltage detector 30.

Switching element Q1 and switching element Q2 may be alternately turned on and off according to a control signal output from control circuit 10b. Output voltage detector 30 is configured to detect an output voltage across capacitor C3, and output the detected voltage to the FB terminal of primary-side control circuit 10b as a feedback signal via photocoupler PC.

Control circuit 10b alternately turns switching element Q1 and switching element Q2 on and off based on a feedback signal from output voltage detector 30. The first terminal of capacitor C4 is connected to the first terminal of primary winding P of transformer T and the first terminal of capacitor C2, the first terminal of resistor R1 is connected to the second terminal of capacitor C4, and the second terminal of resistor R1 is grounded.

Control circuit 10b includes comparators 11, 12, and 14, charge and discharge controller 13, switch circuit SW1, logic circuit 15, oscillator (OSC) 16, AND circuits 17 and 18, high side driver 19, low side driver 20, logic circuits 26 and 29, oscillation controller 27, dv/dt detection circuit+ comparator 43, and SR flip flop circuit 44. Control circuit 10b may be implemented by an integrated circuit (IC). Alternatively, only part of control circuit 10 may be implemented by an integrated circuit (IC).

Control circuit 10b includes: a $V_{GH}$ terminal connected to the gate of switching element Q1, a $V_{GL}$ terminal connected to the gate of switching element Q2, a PL terminal connected to the first terminal of resistor R1, a CL terminal connected to capacitor $C_{CL}$, an SB terminal connected to capacitor $C_{SB}$, and a FB terminal connected to the collector of the phototransistor in photocoupler PC. Selector 40 includes logic circuits 22, 24, and 25 and latch circuit 31. Selector 40 receives input of signals from comparators 41 and 42 and outputs signals to logic circuit 26.

The current resonant power supply device of the embodiment has an automatic standby function with which the current resonant power supply device switches from a normal mode to a standby mode by detecting a standby-state load at control circuit 10b without receiving any standby signal from an outside. The current resonant power supply device detects the standby-state load by using information on current flowing through the primary wiring of the transformer.

In an LLC current resonance system, the current flowing through the primary winding of the transformer contains cyclic current (current not to be sent to a secondary side of the transformer) and load current (current in proportion to output current). The current resonant power supply device can detect the standby state by retrieving information on the load current from the current of the primary winding. Here, in the embodiment, the charge starting trigger at the dedicated standby terminal may be a comparator output of the FB voltage.

Dv/dt detection circuit and comparator 43 is connected to the FB terminal and logic circuit 44. Dv/dt detection circuit and comparator 43 detects an amount of change (dv/dt) of the FB terminal voltage per unit time. Dv/dt detection circuit and comparator 43 detects that the slope of the amount of change (dv/dt) of the FB terminal voltage per unit time becomes constant (e.g. substantially flat). The time point of the detection is used as the charge terminating trigger. Using an event that the FB terminal voltage exceeds VFB_L or VFB_H as a trigger, dv/dt detection circuit and comparator 43 starts extracting the amount of change dv/dt of the FB terminal voltage per unit time. Here, dv/dt detection circuit and comparator 43 detects that the amount of change dv/dt of the FB terminal voltage per unit time become a predetermined level or lower using the comparator. This detection is used as the charge terminating trigger. This charge terminating trigger signal is inputted into logic circuit 44. Here, dv/dt detection circuit and comparator 43 may include a CR circuit or may include an operational amplifier. In addition, dv/dt detection circuit and comparator 43 may further include an amplifier as needed to amplify signals.

As described above, the embodiment allows more optimum accommodation of load fluctuation by detecting the amount of change (dv/dt) of the FB terminal voltage per unit time and using the time point when the amount of change becomes a predetermined level or lower as the trigger to terminate the charge period.

FIG. 8 is a chart illustrating waveforms at a time of a burst oscillation operation of a current resonant power supply device. Here, the detection of the timing of terminating charge based on the amount of change dv/dt of the FB terminal voltage per unit time will be described with reference to FIG. 8.

The output current at the OUT1 terminal is substantially constant. In addition, the output voltage at the OUT1 terminal increases for a certain period of time in response to the intermittent oscillation in the standby mode, and then decreases smoothly.

The FB terminal voltage in the standby mode changes as illustrated in FIG. 8 in response to the increase of the output voltage. In the embodiment, the FB terminal voltage may be operated around 0 to 1 V. Control circuit 10b performs intermittent oscillation in which control circuit 10b alternately repeats a short oscillation period and a long non-oscillation period. This causes the FB terminal voltage to undergo overshoot and then decrease during the oscillation period (t33), and causes the voltage to gradually increase during the non-oscillation period (t36).

In this standby mode state, if the load current increases due to a sudden load change (t36), the output voltage decreases and the FB terminal voltage increases. The increase of the FB terminal voltage causes the amount of change (dv/dt) of the FB terminal voltage per unit time to increase (t37). The time point when the amount of change (dv/dt) of the FB terminal voltage per unit time becomes a predetermined level or lower (t39) is detected, and this time point is used as the trigger to terminate charge. This charge terminating trigger signal is inputted into logic circuit 44. Thereafter, through logic circuits and the like, SW2 switches from SB to FB. This allows optimum accommodation of load fluctuation.

Here, the FB terminal voltage and the SB terminal voltage may be detected, so that the frequency of oscillator OSC16 is switched to the FB control by switch SW2 when the FB terminal voltage and the SB terminal voltage intersect each other. This absorbs sudden change of the oscillation frequency due to hard switching, thus achieving smooth transition to the FB control.

The embodiments have been described so far. Regarding the charge terminating trigger, in the first embodiment, the time point when the burst release comparator is re-inverted is detected based on the FB terminal voltage, and this time point is used as the trigger to terminate charge. In the second embodiment, the inversion is detected with different thresholds using the comparator having predetermined thresholds, and this time point is used as the charge terminating trigger. In the third embodiment, the time point when the amount of change (dv/dt) of the FB terminal voltage per unit time becomes a predetermined level or lower is detected (t39), and this time point is used as the trigger to terminate charge. In another embodiment, capacitor $C_{CL}$ is charged, and the time point when the CL terminal voltage becomes a threshold voltage V2 (t19) is detected, and this time point is used as the charge terminating trigger. These determinations of the charge terminating trigger may be combined and implemented in a control circuit.

In the related arts, when returning from the standby state to the normal state with the automatic standby system, since the rise of the output of PFC circuit is delayed, energy has to be sent while the input of LLC circuit is low. As a result, there is a problem that the lack of the energy tends to make a dip in the secondary output voltage.

At the transition from the standby state to the normal state, a sudden voltage change at the frequency control terminal causes a sudden frequency change. This frequency change causes the hard switching. More specifically, when the frequency control terminal is switched between in the standby state and in the normal state, a voltage difference between the terminals is large, which causes a sudden switching of the frequency.

One or more embodiments improve operation in terms of the load responsiveness for the automatic standby mode as for PFC and current resonance circuit. More specifically, the technique associated with one or more disclosed embodiments, reduces a dip in the secondary output voltage. In a conventional standby control, there has been a problem that a lack of energy tends to cause the dip in the secondary output voltage when the state changes from a standby state back to a normal state. In one or more disclosed embodiments, the LLC circuit may begin sending maximum energy just after the standby return signal is detected. Specifically, quickly charging the frequency control terminal in the timing of returning to the normal state reduces the switching frequency and causes operation with the maximum ON range. This approach solves the lack of energy and reduces the dip in the output voltage.

As another example, the current resonant power supply device may include an internal switch. The maximum ON range operation may be achieved based on switching the internal switch, instead of the frequency control terminal charging.

As described above, one or more embodiments alleviates the lack of energy at the return from the standby state to the normal state in the automatic standby system, and prevents the hard switching by smoothly changing the frequency.

Other embodiments in addition to the above-described embodiments may be included without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A current resonant power supply device comprising:
  a first switch and a second switch connected in series to both terminals of a DC power source;
  a series circuit including a reactor, a primary winding of a transformer, and a capacitor connected in series, and connected to a node between the first and second switches and one terminal of the DC power source;
  a rectifier smoothing circuit that rectifies and smoothens a voltage generated across a secondary winding of the transformer and outputs a DC voltage;
  a voltage detection circuit that detects the DC voltage from the rectifier smoothing circuit;
  a signal generation circuit that generates a feedback signal based on the DC voltage detected by the voltage detection circuit, and outputs the feedback signal, the feedback signal for turning the first and second switches on and off;
  a load current detection circuit that detects load current contained in resonance current flowing through the capacitor;
  a standby state detection circuit that detects a standby state based on the load current detected by the load current detection circuit and a standby threshold;
  a burst oscillation circuit that generates a burst oscillation signal based on the feedback signal and turns the first switch element and the second switch element on and off based on the burst oscillation signal when the standby state is detected, wherein
  the burst oscillation circuit comprises a capacitor and a rapid charge circuit, wherein
  when the current resonant power supply device returns from standby state to normal state, the rapid charging circuit charges the capacitor after the feedback signal exceeds the cancellation threshold voltage.

2. The current resonant power supply device according to claim 1, wherein
the burst oscillation circuit includes a comparator that compares the feedback signal with a cancellation threshold voltage to cancel the burst oscillation.

3. The current resonant power supply device according to claim 2, wherein
the comparator compares a charged voltage of the capacitor as the burst oscillation signal.

4. The current resonant power supply device of claim 1, further comprising:
a second comparator with a second threshold different from that of the comparator; and
an inversion detection circuit that detects inversion of the second comparator, wherein
the burst oscillation circuit generates a burst oscillation signal based on detection of the inversion of the second comparator made by the inversion detection circuit.

5. The current resonant power supply device of claim 1, wherein
the load current detection circuit comprises a second capacitor, and
the burst oscillation circuit generates a charge terminating trigger based on a voltage at a first terminal of the second capacitor.

6. The current resonant power supply device of claim 1, further comprising:
a dv/dt detection circuit that detects a time point when an amount of change of the feedback signal per unit time becomes a predetermined level or lower, wherein
the burst oscillation circuit generates a burst oscillation signal based on detection of the amount of change of the feedback signal per unit time made by the dv/dt detection circuit.

* * * * *